(12) United States Patent
Thanganadar et al.

(10) Patent No.: US 12,303,830 B2
(45) Date of Patent: May 20, 2025

(54) COMBUSTION SYSTEM HAVING A FUEL CELL AND A CARBON CAPTURE SYSTEM

(71) Applicant: GE Infrastructure Technology LLC, Greenville, SC (US)

(72) Inventors: Dhinesh Thanganadar, Karnataka (IN); Murali Krishna Kalaga, Karnataka (IN); Raub Warfield Smith, Schenectady, NY (US); Thomas Raymond Farrell, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/640,772

(22) Filed: Apr. 19, 2024

(65) Prior Publication Data

US 2024/0359134 A1   Oct. 31, 2024

(30) Foreign Application Priority Data

Apr. 26, 2023  (IN) .............................. 202311030100

(51) Int. Cl.
*B01D 53/62* (2006.01)
*B01D 53/02* (2006.01)
(Continued)

(52) U.S. Cl.
CPC ............. *B01D 53/62* (2013.01); *B01D 53/02* (2013.01); *F01K 23/10* (2013.01); *H02K 7/1823* (2013.01);
(Continued)

(58) Field of Classification Search
CPC ...... B01D 53/02; B01D 53/343; B01D 53/62; B01D 2257/504; B01D 2258/0283;
(Continued)

(56) References Cited

U.S. PATENT DOCUMENTS

| 4,041,210 A | 8/1977 | Van Dine |
| 4,921,765 A | 5/1990 | Gmeindl et al. |

(Continued)

FOREIGN PATENT DOCUMENTS

| CN | 103206307 B | 6/2015 |
| CN | 103410614 B | 12/2015 |

(Continued)

OTHER PUBLICATIONS

Barckholtz et al., Molten Carbonate Fuel Cells for Simultaneous $CO_2$ Capture, Power Generation, and $H_2$ Generation, Applied Energy, 118553, vol. 313, 2022, 21 pages. Retrieved from https://www.sciencedirect.com/science/article/pii/S0306261922000393 https://doi.org/10.1016/j.apenergy.2022.118553.

(Continued)

*Primary Examiner* — Loren C Edwards
(74) *Attorney, Agent, or Firm* — Dority & Manning, P.A.

(57) ABSTRACT

A combustion system includes a topping cycle that generates a flow of exhaust gas, a bottoming cycle, and a fuel cell. The fuel cell includes an anode side, a cathode side, and an electrolyte. The cathode side receives the flow of exhaust gas from the topping cycle via a cathode inlet line. The cathode side removes a first portion of pollutants from the exhaust gas. A heat recovery steam generator (HRSG) receives the exhaust gases from the cathode side via a cathode outlet line, and the HRSG generates a flow of steam for use in the bottoming cycle. A bypass line extends from the cathode inlet line to the cathode outlet line. The combustion system further includes a carbon capture system that is fluidly coupled to the HRSG via an HRSG outlet line. The carbon capture system removes a second portion of pollutants from the exhaust gas.

18 Claims, 4 Drawing Sheets

(51) Int. Cl.
*F01K 23/10* (2006.01)
*H02K 7/18* (2006.01)

(52) U.S. Cl.
CPC ............... *B01D 2257/504* (2013.01); *B01D 2258/0283* (2013.01); *F05D 2260/61* (2013.01)

(58) Field of Classification Search
CPC ... F01K 23/10; H02K 7/1823; F05D 2260/61; H01M 8/0662; H01M 8/0668; Y02E 20/16; Y02E 60/50
See application file for complete search history.

(56) References Cited

U.S. PATENT DOCUMENTS

| | | | |
|---|---|---|---|
| 5,021,303 | A | 6/1991 | Donado |
| 5,449,568 | A | 9/1995 | Micheli et al. |
| 5,541,014 | A | 7/1996 | Micheli et al. |
| 7,396,603 | B2 | 7/2008 | Farooque et al. |
| 7,752,848 | B2 | 7/2010 | Balan et al. |
| 8,329,345 | B2 | 12/2012 | Koda et al. |
| 9,077,006 | B2 | 7/2015 | Berlowitz et al. |
| 9,178,234 | B2 | 11/2015 | Berlowitz et al. |
| 9,257,711 | B2 | 2/2016 | Berlowitz et al. |
| 9,343,763 | B2 | 5/2016 | Berlowitz et al. |
| 9,343,764 | B2 | 5/2016 | Berlowitz et al. |
| 9,362,580 | B2 | 6/2016 | Berlowitz et al. |
| 9,520,607 | B2 | 12/2016 | Berlowitz et al. |
| 9,647,285 | B2 | 5/2017 | Bove |
| 9,735,440 | B2 | 8/2017 | Berlowitz et al. |
| 9,786,939 | B2 | 10/2017 | Berlowitz et al. |
| 9,812,723 | B2 | 11/2017 | Ghezel-Ayagh |
| 9,825,319 | B2 | 11/2017 | Bove |
| 9,923,219 | B2 | 3/2018 | Berlowitz et al. |
| 9,941,534 | B2 | 4/2018 | Berlowitz et al. |
| 10,093,997 | B2 | 10/2018 | Berlowitz et al. |
| 10,170,782 | B2 | 1/2019 | Farooque et al. |
| 10,439,242 | B2 | 10/2019 | Sundaram et al. |
| 10,608,272 | B2 | 3/2020 | Jahnke |
| 10,673,084 | B2 | 6/2020 | Ghezel-Ayagh |
| 10,676,799 | B2 | 6/2020 | Berlowitz et al. |
| 11,043,684 | B2 | 6/2021 | Jahnke et al. |
| 2003/0190503 | A1 | 10/2003 | Kumar et al. |
| 2005/0123810 | A1 | 6/2005 | Balan |
| 2005/0204629 | A1 | 9/2005 | Gittleman et al. |
| 2010/0028730 | A1 | 2/2010 | Ghezel-Ayagh et al. |
| 2011/0138766 | A1* | 6/2011 | ELKady ............. F02C 3/30 60/39.24 |
| 2012/0094198 | A1 | 4/2012 | Chandran |
| 2013/0014484 | A1 | 1/2013 | Caprile et al. |
| 2014/0261090 | A1 | 9/2014 | Berlowitz et al. |
| 2014/0272619 | A1 | 9/2014 | Berlowitz et al. |
| 2014/0272620 | A1 | 9/2014 | Berlowitz et al. |
| 2014/0272635 | A1 | 9/2014 | Berlowitz et al. |
| 2015/0093676 | A1 | 4/2015 | Berlowitz et al. |
| 2017/0141421 | A1 | 5/2017 | Sundaram et al. |
| 2019/0123372 | A1 | 4/2019 | Jahnke et al. |
| 2020/0176795 | A1 | 6/2020 | Johnson |
| 2021/0299609 | A1* | 9/2021 | Matake ............. H01M 8/0662 |

FOREIGN PATENT DOCUMENTS

| | | |
|---|---|---|
| CN | 214424586 U | 10/2021 |
| EP | 0433681 B1 | 1/1995 |
| EP | 2356715 A1 | 8/2011 |
| EP | 1804322 B1 | 12/2011 |
| EP | 2517296 B1 | 12/2013 |
| EP | 2715850 B1 | 8/2018 |
| EP | 3262703 B1 | 12/2021 |
| KR | 101142472 B1 | 5/2012 |
| KR | 101309558 B1 | 9/2013 |
| WO | WO2010/044113 A1 | 4/2010 |
| WO | WO2010/139724 A1 | 12/2010 |
| WO | WO2015/048622 A1 | 4/2015 |

OTHER PUBLICATIONS

Fuel Cell Energy Inc, Carbon Capture with Fuel Cell Power Plants, Jul. 2022, 10 Pages. Retrieved Nov. 8, 2022 from Webpage: https://go.fuelcellenergy.com/hubfs/Carbon%20Capture%20with%20FuelCell%20Energy%20Systems.pdf.

Greppi et al., Membranes and Molten Carbonate Fuel Cells to Capture $CO_2$ and Increase Energy Production in Natural Gas Power Plants, Industrial & Engineering Chemistry Research, vol. 52, No. 26, 2013, 8755-8764. (Abstract Only) https://pubs.acs.org/doi/abs/10.1021/ie302725a.

Jolly, Pre-FEED Study of a MW-Class Molten Carbonate Fuel Cell System for Carbon Capture Demonstration at an Oil Sands Facility—Final Report, p. 52, FuelCell Energy, Inc., 2017, 181 Pages. https://albertainnovates.ca/app/uploads/2020/10/FuelCell-Energy-Pre-FEED-Study-of-a-MW-Class-Molten-Carbonate-Fuel-Cell-System-for-Carbon-Capture-Demonstration-at-an-Oil-Sands-Facility_.pdf.

Manzolini et al., $CO_2$ Separation from Combined Cycles Using Molten Carbonate Fuel Cells, Journal of Fuel Cell Science and Technology, vol. 9, Issue 1, 011018-1-8, 2011. (Abstract Only) Retrieved from https://doi.ort/10.1115/1.4005125 http://dx.doi.org/10.1115/FuelCell2011-54719.

European Search Report Corresponding to Application No. 24168467 on Oct. 21, 2024.

* cited by examiner

COMBUSTION SYSTEM HAVING A FUEL CELL AND A CARBON CAPTURE SYSTEM

CROSS-REFERENCE TO RELATED APPLICATIONS

This application claims priority pursuant to 35 U.S.C. 119 (a) to Indian application No. 202311030100, filed Apr. 26, 2023, which application is incorporated herein by reference in its entirety.

FIELD

The present disclosure relates generally to a combustion system having a fuel cell and one or more additional carbon capture systems. Particularly, the present disclosure relates to a combustion system having a fuel cell and a carbon capture system.

BACKGROUND

A gas turbine power plant such as a combined cycle power plant (CCPP) or combined cycle system (CCS) generally includes a gas turbine having a compressor section, a combustion section, a turbine section, a heat recovery steam generator (HRSG) that is disposed downstream from the turbine and at least one steam turbine in fluid communication with the HRSG. During operation, air enters the compressor via an inlet system and is progressively compressed as it is routed towards a compressor discharge or diffuser casing that at least partially surrounds the combustor(s) of the combustion section. At least a portion of the compressed air is mixed with a fuel and burned within a combustion chamber defined within the combustor(s), thereby generating high temperature and high-pressure combustion gases.

The combustion gases are routed along a hot gas path from the combustor through the turbine where they progressively expand as they flow across alternating stages of stationary vanes and rotatable turbine blades which are coupled to a rotor shaft. Energy is transferred from the combustion gases to the turbine blades, causing the rotor shaft to rotate. The rotational energy of the rotor shaft may be converted to electrical energy via a generator. The combustion gases exit the turbine as exhaust gas, and the exhaust gas enters the HRSG. Thermal energy from the exhaust gas is transferred to water flowing through one or more heat exchangers of the HRSG, thereby producing superheated or supercritical steam. The superheated steam is then routed into the steam turbine which may be used to generate additional electricity, thus enhancing overall power plant efficiency.

Turbomachine combustion systems usually burn hydrocarbon fuels and produce air polluting emissions such as oxides of nitrogen (NOx), carbon monoxide (CO), and carbon dioxide ($CO_2$). In an effort to reduce emissions, carbon capture systems are utilized to capture the $CO_2$, and other air polluting gases before exhausting the turbomachine gases to the atmosphere. However, known carbon capture systems are only partially effective and require a large amount of energy.

Accordingly, an improved combined cycle power plant having a carbon capture system, that removes pollutants from the emissions without requiring a large amount of electrical power, is desired and would be appreciated in the art.

BRIEF DESCRIPTION

Aspects and advantages of the combined cycle systems and methods in accordance with the present disclosure will be set forth in part in the following description, or may be obvious from the description, or may be learned through practice of the technology.

In accordance with one embodiment, a combustion system is provided. The combustion system includes a topping cycle that generates a flow of exhaust gas, a bottoming cycle, and a fuel cell. The fuel cell includes an anode side, a cathode side, and an electrolyte. The cathode side receives the flow of exhaust gas from the topping cycle via a cathode inlet line. The cathode side removes a first portion of pollutants from the exhaust gas. A heat recovery steam generator (HRSG) receives the exhaust gases from the cathode side via a cathode outlet line, and the HRSG generates a flow of steam for use in the bottoming cycle. The combustion system further includes a bypass line that extends from the cathode inlet line to the cathode outlet line. The combustion system further includes a carbon capture system that is fluidly coupled to the HRSG via an HRSG outlet line. The carbon capture system removes a second portion of pollutants from the exhaust gas.

In accordance with another embodiment, a method of removing pollutants in a combustion system is provided. The method includes operating a topping cycle of the combustion system, whereby a first power output and exhaust gases are generated. The method further includes conveying the exhaust gases through a cathode side of a fuel cell, whereby a first portion of the pollutants are removed from the exhaust gases. The method further includes providing the exhaust gases from an outlet of the cathode side to a carbon capture system. A second portion of the pollutants are removed from the exhaust gases by the carbon capture system.

In accordance with another embodiment, a method of operating the combustion system is provided. The combustion system includes a topping cycle, a fuel cell fluidly coupled to the topping cycle, and a carbon capture system the method includes operating the toping cycle, whereby exhaust gases are generated. The method further includes providing a first amount of the exhaust gases to a cathode side of the fuel cell. The method further includes providing a second amount of the exhaust gases to the carbon capture system at least partially via a bypass line that fluidly couples to the combustion system downstream of the fuel cell. The method further includes varying the first amount and the second amount while maintaining a total plant capture rate.

These and other features, aspects and advantages of the present combustion systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combustion systems and methods, including the best mode of making and using the present systems and methods, directed to one of ordinary skill in the art, is set forth in the specification, which makes reference to the appended figures, in which.

DETAILED DESCRIPTION

Figure 1:
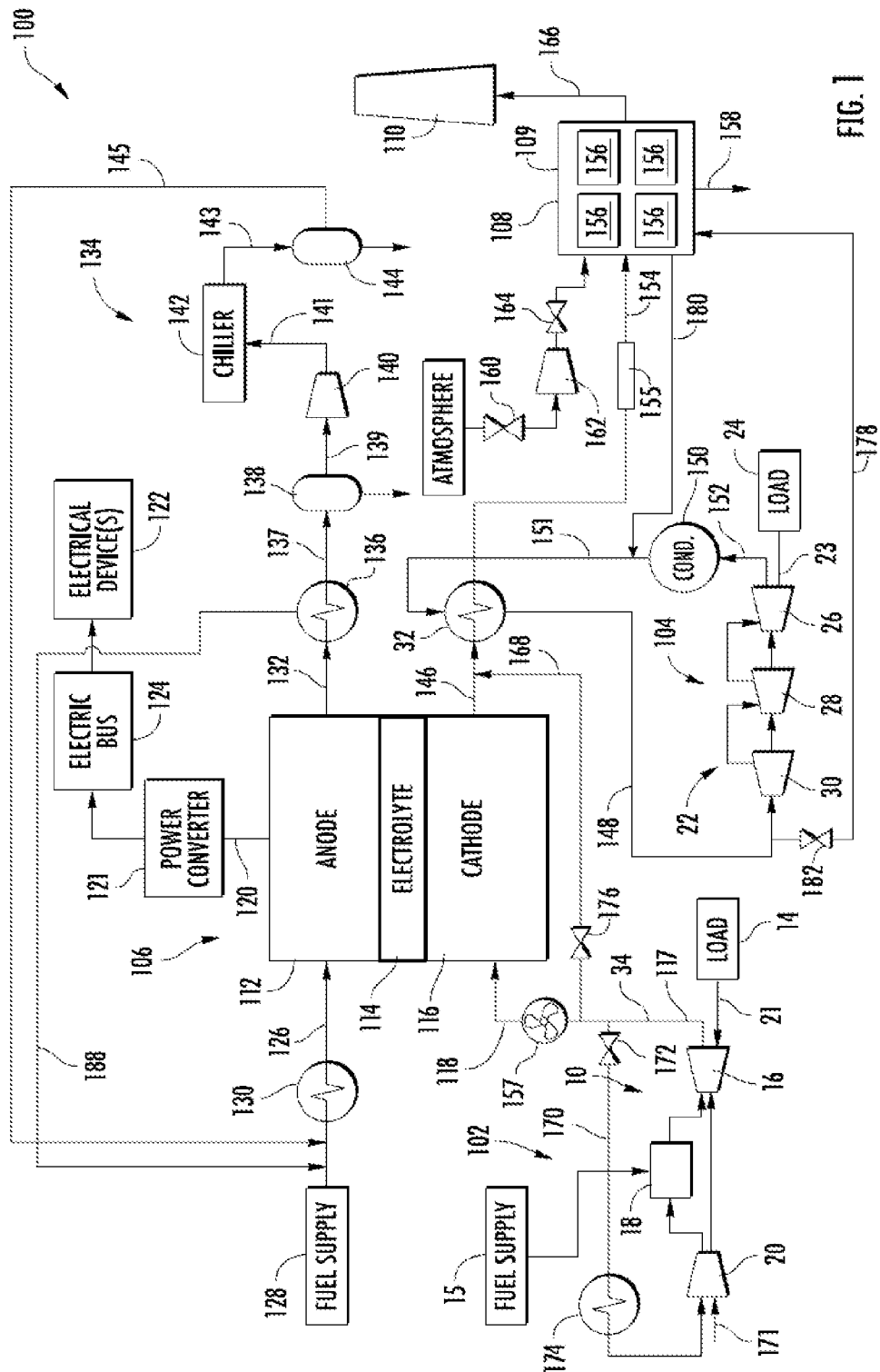
FIG. 1 is a schematic illustration of a combustion system in accordance with embodiments of the present disclosure.

Reference now will be made in detail to embodiments of the present combustion systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion.

For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "line" may refer to a fluid carrying conduit, such as a pipe, hose, tube, duct, or other fluid carrying conduit.

Figure 2:
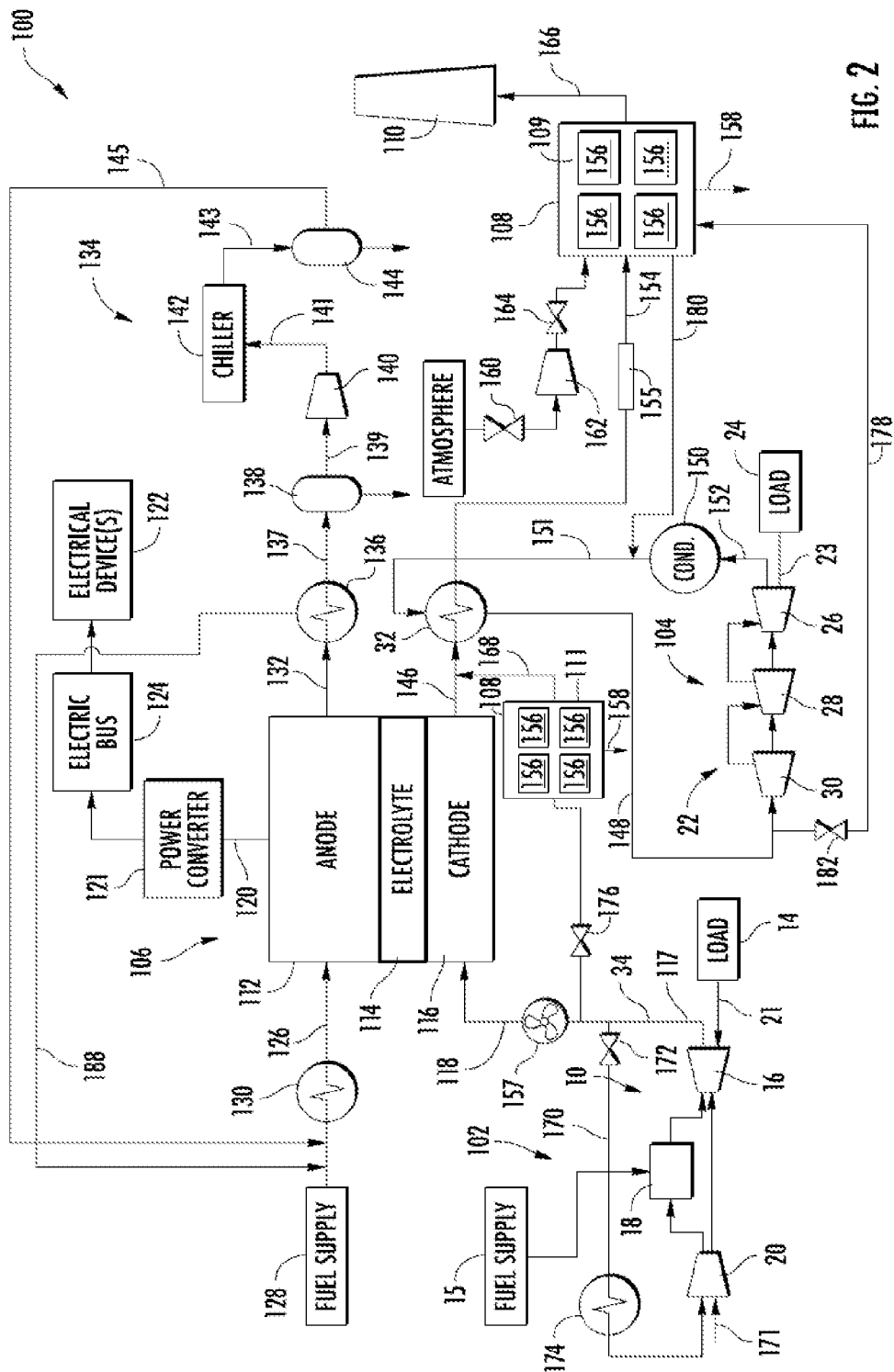
FIG. 2 is a schematic illustration of a combustion system in accordance with embodiments of the present disclosure.

Referring now to the drawings, FIGS. 1 and 2 each illustrate a schematic diagram an embodiment of a combustion system or combined cycle system 100 that includes a topping cycle 102 and a bottoming cycle 104. In the topping cycle 102, fuel is burnt to produce electrical or mechanical power, and, as a result, exhaust gas 34 containing carbon dioxide is generated. In the bottoming cycle 104, the exhaust gas 34 from the topping cycle 102 may be then used to produce additional electrical or mechanical power. In various embodiments, the topping cycle 102 may be an internal combustion engine, an in industrial process in which fuel is burned, or others. In some embodiments, the bottoming cycle 104 may be a heat exchanger, a boiler, a supercritical $CO_2$ cycle, a superheater, an evaporator, a pump, or others. In exemplary embodiments, as shown, the topping cycle 102 may be a gas turbine 10, and the bottoming cycle 104 may be a steam turbine system 22.

The combined cycle system 100 may include a gas turbine 10 for driving a first load 14. The gas turbine 10 may be the topping cycle 102 in exemplary embodiments of the present disclosure. The first load 14 may, for instance, be an electrical generator for producing electrical power. In this way, the gas turbine 10 may produce a first power output, which may be included in the total plant power output produced by the combined cycle system 100. The gas turbine 10 may include a turbine section 16, combustors or a combustion section 18, and a compressor section 20. The turbine section 16 and the compressor section 20 may be connected by one or more shafts 21. A combustor fuel supply 15 may supply a fuel to the combustors in the combustion section 18. The combustor fuel supply 15 may supply a natural gas to the combustion section 18, such as a hydrocarbon fuel, which may include methane, propane, or others. In exemplary embodiments, the combustor fuel supply 15 may supply methane ($CH_4$) to the combustion section 18. Additionally, or alternatively, the combustor fuel supply 15 may supply liquid fuel to the combustors, such as diesel, crude oil, syngas, or others.

During operation of the gas turbine 10, a working fluid such as air 171 flows into the compressor section 20 where the air is progressively compressed, thus providing compressed air to the combustor(s) of combustion section 18. The compressed air is mixed with fuel and burned within each combustor to produce combustion gases. The combustion gases flow through the hot gas path from the combustion section 18 into the turbine section 16, where energy (kinetic and/or thermal) is transferred from the combustion gases to the rotor blades, causing the one or more shafts 21 to rotate. The mechanical rotational energy may then be used to power the compressor section 20 and/or to generate electricity.

Heated exhaust gas 34 exiting the turbine section 16 may be first routed through a fuel cell 106 before entering a heat recovery steam generator (HRSG) 32. Particularly, a first amount of the exhaust gas from the turbine section 16 may be routed to a cathode side 116 of the fuel cell 106, where a first portion of pollutants are removed from the exhaust gas. The cathode output products, along with a second portion of the exhaust gas, may be routed to the HRSG 32. In the HRSG 32, a heat transfer takes place between the exhaust gas 34 (and/or cathode output products) and the various components of the HRSG 32 to generate steam, which is provided to the steam turbine system 22. The second amount of the exhaust gases 34, along with the cathode output products, may then be routed to a carbon capture system 108, such as an adsorption bed, where a second portion (e.g., a remainder) of the pollutants (e.g., $CO_2$) is removed from the exhaust gas. Finally, the exhaust gas, which has had all pollutants removed by the fuel cell 106 and/or the carbon capture system 108, may exit to the atmosphere via an exhaust stack 110.

Upon exiting the turbine section 16, the exhaust gas 34 may include mostly nitrogen ($N_2$), carbon dioxide ($CO_2$), oxygen ($O_2$), and water ($H_2O$). Additionally, the exhaust gas 34 may include traces of carbon monoxide (CO), nitrogen oxides (NOx), sulfur oxides (SOx), and/or argon (Ar). In exemplary implementations of the combined cycle system 100, a first portion of the carbon dioxide ($CO_2$) may be removed from the exhaust gas 34 in the fuel cell 106, and a second portion of the carbon dioxide ($CO_2$) may be removed from the exhaust gas 34 in the additional carbon capture system 108 (e.g., an adsorption bed). In many embodiments, the second portion of the $CO_2$ that is removed in the carbon capture system 108 may be a remainder of the $CO_2$ in the exhaust gas 34, such that all of the $CO_2$ (e.g., 100%) may be removed from the exhaust gas 34 prior to being exhausted via the exhaust stack 110.

The combined cycle system 100 may also include the steam turbine system 22 for driving a second load 24. The steam turbine system 22 may be the bottoming cycle 104 in exemplary embodiments of the present disclosure. The second load 24 may also be an electrical generator for generating electrical power. In this way, the steam turbine system 22 may produce a second power output, which may be included in the total plant power output produced by the combined cycle system 100. However, both the first and second loads 14, 24 may be other types of loads capable of being driven by the gas turbine 10 and steam turbine system 22. In addition, although the gas turbine and steam turbine system 22 may drive separate loads 14 and 24, as shown in the illustrated embodiment, the gas turbine 10 and steam turbine system 22 may also be utilized in tandem to drive a single load via a single shaft.

In the illustrated embodiment, the steam turbine system 22 may include a low pressure (LP) steam turbine 26, an intermediate pressure (IP) steam turbine 28, and a high pressure (HP) steam turbine 30. The low pressure (LP) steam turbine 26, the intermediate pressure (IP) steam turbine 28, the high pressure (HP) steam turbine 30, and the load 24 may each be disposed on one or more shafts 23 (such as a common shaft in some embodiments).

In exemplary embodiments, the fuel cell 106 may include an anode side 112, a cathode side 116, and an electrolyte 114 (which may conduct electrically charged ions). The fuel cell 106 may directly convert chemical energy stored in hydrocarbon fuel into electrical energy by means of an electrochemical reaction. In exemplary embodiments, the fuel cell 106 may be a molten carbonate fuel cell (MCFC), such as an internal reforming MCFC and/or an external reforming MCFC. In such embodiments, the electrolyte 114 may be a molten carbonate salt mixture suspended in a porous, chemically inert, ceramic matrix of beta-alumina solid electrolyte (BASE). The MCFC may operate by passing a reactant fuel gas (e.g., natural gas) through the anode side 112, while oxidizing gas (e.g., the exhaust gas which contains carbon dioxide along with oxygen) is passed through the cathode side 116, which causes an electrochemical reaction across the electrolyte 114 that consumes (or chemically converts) carbon dioxide and produces electricity. Particularly, in the cathode side 116, oxygen and carbon dioxide formulate carbonate ions ($CO_3^{2-}$).

As briefly mentioned above, the fuel cell 106 converts the anode fuel stream and exhaust gas into electrical energy while removing $CO_2$ from the exhaust gas (e.g., the $CO_2$ is removed via an electrochemical reaction within the fuel cell 106). For example, a fuel cell power output 120 may be directed to a power converter 121 in order to change the DC current into AC current that can be effectively utilized by one or more subsystems. In particular, for the embodiment depicted, the power output 120 is provided from the power converter to one or more electric devices 122 via an electric bus 124. The electric bus 124 may be an electric bus dedicated to the combined cycle system 100, the gas turbine 10, the steam turbine system 22, an electric bus of the fuel cell 106, an electric bus of the carbon capture system 108, or others. The electric bus 124 is in electric communication with one or more additional electrical devices 122, which may be a power source, a power sink, or both. For example, the additional electrical devices 122 may be a power storage device (such as one or more batteries), an electric machine (an electric generator, an electric motor, or both). Alternatively, or additionally, the power output 120 may aid in driving the first load 14 and/or the second load 24. The combined cycle system 100 may generate a total power output. The total power output may be the summation of the first power output produced by the gas turbine 10 driving the first load 14, the second power output produced by the steam turbine system 22 driving the second load 24, and the power output 120 of the fuel cell 106. In many embodiments, the power output 120 of the fuel cell 106 may be between about 10% and about 30% of the total power output of the combined cycle system 100. In other embodiments, the power output 120 of the fuel cell 106 may be between about 15% and about 25% of the total power output of the combined cycle system 100.

In many embodiments, the cathode side 116 may be fluidly coupled (e.g., directly fluidly coupled) to the gas turbine 10 via a cathode inlet line 118. The cathode inlet line 118 may be the same conduit as an exhaust outlet line 117 extending from an outlet of the turbine section 16, or the cathode inlet line 118 may extend from the exhaust outlet line 117. Particularly, the cathode side 116 may be fluidly coupled to an outlet of the turbine section 16 such that the cathode side 116 receives a flow of exhaust gas 34 from the turbine section 16. For example, the cathode inlet line 118 may extend (e.g., directly) between an outlet of the turbine section 16 and an inlet of the cathode side 116 of the fuel cell 106 to convey exhaust gas 34 from the turbine section 16 to the cathode side 116.

In many embodiments, a first amount of the exhaust gas 34 from the outlet of the turbine section 16 may be routed through the cathode side 116 of the fuel cell 106 to remove a first portion of pollutants (e.g., $CO_2$) from the first amount of exhaust gas 34. In optional embodiments, as shown in FIG. 1, a fan or blower 157 may be included on the cathode inlet line 118. The fan 157 may advantageously overcome the flow resistance in the cathode side 116, HRSG 32, direct contact cooler 155, and carbon capture system 108. In other words, the fan 157 may promote the flow of exhaust gases through the cathode side 116, HRSG 32, direct contact cooler 155, and carbon capture system 108.

In various embodiments, the anode side 112 may receive a flow of fuel and/or steam via an anode inlet line 126. The fuel and/or steam may be conveyed through the anode side 112. The anode inlet line 126 may fluidly couple the anode side 112 to an anode fuel supply 128. In some embodiments, the anode fuel supply 128 may be the same as the combustor fuel supply 15, such that the same fuel is supplied to both the combustion section and the anode side of the fuel cell 106. In other embodiments, the anode fuel supply 128 and the combustor fuel supply 15 may be different. In many implementations, the anode fuel supply 128 may supply a natural gas (e.g., a hydrocarbon fuel) to the anode side 112 via the anode inlet line 126. The natural gas may include methane, propane, or others. In exemplary embodiments, the anode fuel supply 128 may supply methane ($CH_4$) to the anode side 112. A fuel preheater 130, such as a heat exchanger, may be disposed in thermal communication on the anode inlet line 126. The fuel preheater 130 may heat the fuel prior to entrance into the anode side 112 of the fuel cell 106, which advantageously increases the efficiency of the fuel cell 106.

In exemplary embodiments, the combined cycle system 100 may include an anode steam supply line 188. The anode steam supply line 188 may extend between the heat exchanger 136 and the anode inlet line 126. Steam may be produced by the heat from the anode output products within the heat exchanger 136 and provided to the anode inlet line 126. The anode steam supply line 188 may provide a flow of steam to the anode inlet line 126 for use in the anode side 112 of the fuel cell 106. In various embodiments (not shown), the anode steam supply line 126 may be fluidly coupled to the HRSG 32, such that the HRSG 32 supplies steam to both the steam turbine system 22 and the anode side 112 of the fuel cell 106.

In many embodiments, the combined cycle system 100 may include an anode outlet line 132 that is fluidly coupled to an outlet of the anode side 112, such that the anode outlet line 132 receives the output products from the anode side 112 after the electrochemical reaction within the fuel cell 106. In certain embodiments, the anode output products may include $CO_2$, CO, $H_2$, water, and unutilized $CH_4$ (e.g., methane that was not utilized within the fuel cell 106 during the electrochemical reaction). The anode output products may be supplied to a separation system 134, which may remove the water and liquified $CO_2$ from the anode output products.

The separation system 134 may include, in a serial flow order (e.g., from upstream to downstream), a heat exchanger 136, a water flash separator 138, a compressor 140, a chiller 142, and a liquid carbon dioxide separator 144. The heat exchanger 136 may be thermally and fluidly coupled to the anode outlet line 132. For example, the anode outlet line 132 may extend between an outlet of the anode side 112 and the heat exchanger 136. The heat exchanger 136 may remove heat from the anode output products prior to entrance into the water flash separator 138, which produces steam in the steam inlet line 188 for use at the inlet of the anode side in order to maintain a desired steam to carbon molar ratio (which may be between about 1.5 and about 5, or particularly between about 2 and about 3). A water flash inlet line 137 may extend between, and fluidly couple, the heat exchanger 136 and the water flash separator 138. The water flash separator 138 may remove any water from the anode output products. For example, the water in the anode output products may be cooled to a liquification temperature by the heat exchanger 136 and subsequently removed by the water flash separator 138. In some embodiments, the anode output products may pass through a water gas shift reactor to convert the carbon monoxide to hydrogen. In such embodiments, the water gas shift reactor may be disposed between the heat exchanger 136 and the water flash separator 138.

In many embodiments, a compressor inlet line 139 may extend between, and fluidly couple, the water flash separator 138 and the compressor 140. The compressor 140 may pressurize the anode output products and provide the pressurized anode output products to a chiller 142 via a chiller inlet line 141. The chiller 142 may liquify the $CO_2$ in the pressurized anode output products by reducing the temperature of the pressurized anode output products. Subsequently, the liquid $CO_2$ may be removed via the liquid carbon dioxide separator 144. The removed liquid carbon dioxide may be sent to carbon sequestration or utilization. For example, the chiller 142 may be fluidly coupled to the liquid carbon dioxide separator 144 via a connection line 143.

An anode recirculation line 145 may extend from an outlet of the separation system 134 to the anode inlet line 126 (upstream of the fuel preheater 130). For example, the anode recirculation line 145 may extend from the liquid carbon dioxide separator 144 to the anode inlet line 126 downstream of the fuel preheater 130 to reintroduce the anode output products (which have had the water and liquid carbon dioxide removed) into the anode side 112. For example, the anode recirculation line 145 may advantageously reintroduce any unutilized methane and excess hydrogen back into the anode side 112 for electrochemical conversion.

In some embodiments, as shown in FIG. 1, the HRSG 32 may be disposed downstream of the cathode side 116. In such embodiments, the HRSG 32 may be fluidly coupled (e.g., directly fluidly coupled in some embodiments) to an outlet of the cathode side 116 of the fuel cell 106. The HRSG 32 may generate a flow of steam for use in the bottoming cycle 104. For example, a cathode outlet line 146 may extend between, and fluidly couple, an outlet of the cathode side 116 and the HRSG 32. The HRSG 32 may generate steam with the heat from the exhaust gases exiting the cathode side 116, and the steam may be supplied to the steam turbine system 22.

In exemplary embodiments, a bypass line 168 may extend between, and fluidly couple, the cathode inlet line 118 to the cathode outlet line 146. Particularly, the bypass line 168 may extend from the cathode inlet line 118 to the cathode outlet line 146. As shown in FIGS. 1 and 2, the bypass line 168 may extend from the cathode inlet line 118 upstream of the fan 157 and downstream of the exhaust gas recirculation line 170. The bypass line 168 may extend to the cathode outlet line 146 immediately downstream of the cathode side 116 and immediately upstream of the HRSG 32. The bypass line 168 may allow a second amount of the exhaust gas exiting the turbine section 16 to bypass the fuel cell 106 and be provided to the HRSG 32 and/or the carbon capture system 108, which may be advantageous when the fuel cell 106 is starting up, during turndown conditions (i.e., when the CCPP 100 is producing less than the maximum plant power output), and/or during load increasing conditions.

In many embodiments, as shown in FIGS. 1 and 2, a bypass control valve 176 disposed in fluid communication on the bypass line 168. For example, the bypass control valve 176 may be disposed on, and in fluid communication with, the bypass line 168. The bypass control valve 176 may regulate the amount (i.e., the second amount) of exhaust gas permitted to flow through the bypass line 168, thereby regulating an amount (i.e., the first amount) of exhaust gas flowing through the cathode side 116. In other words, the first amount of exhaust gas flowing through the cathode side 116 and the second amount of exhaust gas flowing through the bypass line 168 may be adjusted (or modified) by modulating (or actuating) the bypass control valve 176.

the bypass control valve 176 may be operable to selectively restrict the flow of exhaust gas through the bypass line 168. For example, the bypass line 168 may be actuatable between a fully open position, in which the flow of exhaust gas therethrough is unrestricted, and a fully closed position, in which the flow of exhaust therethrough is fully restricted. In addition, the bypass control valve 176 may be actuatable to any position between the fully open and fully closed position, such as anywhere between 0% and 100% restricted. In some embodiments, the fuel supplied to the anode side 112, and the exhaust gases supplied to the cathode side 116, are coordinately adjusted to achieve the desired carbon capture rate & the power output from the fuel cell 106 in an energy efficient manner, whilst keeping the plant level capture rate unchanged.

A steam supply line 148 may extend from the HRSG 32 to the steam turbine system 22. Particularly, the steam supply line 148 may extend from the HRSG 32 to the HP steam turbine 30. The outlet of the HP steam turbine 30 may be fluidly coupled to an inlet of the IP steam turbine 28, and an outlet of the IP steam turbine 28 may be fluidly coupled to an inlet of the LP steam turbine 26. Alternatively, in other embodiments (not shown), the outlet steam of the HP steam turbine 30 may re-enter a reheater in the HRSG and be superheated and subsequently returned to an inlet of the IP steam turbine 28. An outlet of the LP steam turbine may be fluidly coupled to a condenser 150 via a turbine outlet line 152. The condenser may convert the steam from the outlet of the LP steam turbine 26 to water, which may be provided back to the HRSG 32 via a condensate return line 151.

In many embodiments, as shown in FIG. 1, a carbon capture system 108, such as a sorbent based carbon capture system, may be fluidly coupled to the fuel cell 106, such that the carbon capture system 108 receives a mixture of cathode output products from the cathode side 116 of the fuel cell 106 and the second amount of exhaust gas from the bypass supply line 168. Particularly, the carbon capture system 108 may be fluidly coupled to an outlet of the HRSG 32 via an HRSG outlet line 154. The HRSG outlet line 154 may convey the mixture of gases from the outlet of the HRSG 32 to the carbon capture system 108. In exemplary embodiments, the carbon capture system 108 may be an adsorption bed 156 that removes a second portion of pollutants (e.g., $CO_2$) from the exhaust gas. Particularly, the carbon capture system 108 may include a plurality of adsorption beds 156 may remove the remainder of the $CO_2$ from the exhaust gas, such that all of the $CO_2$ is removed from the exhaust gas prior to exiting the exhaust stack 110.

Additionally, in some embodiments, as shown in FIG. 1, a direct contact cooler 155 may be included in the HRSG outlet line 154 for further cooling the exhaust gas exiting the HRSG 32 prior to entrance into the carbon capture system 108. For example, the direct contact cooler 155 may be disposed on the HRSG outlet line 154 upstream of the carbon capture system 108. The direct contact cooler 155 may spray water (or other suitable coolant) into the exhaust gases, thereby cooling the temperature of the exhaust gases prior to entrance into the carbon capture system 108.

The plurality of adsorption beds 156 may continually capture $CO_2$ from the mixture of cathode output products and the second amount of exhaust gas provided by the bypass line 168. For example, for a vacuum temperature swing adsorption process, the adsorption beds 156 may alternate between an adsorption process, a regeneration process, and a cooling process to continually capture $CO_2$.

The adsorption process involves passing the gas stream containing $CO_2$ through one or more of the adsorption beds 156, which contain sorbent material (such as activated carbon, zeolites, metal organic frameworks, or other sorbent material). The sorbent material may absorb $CO_2$ via either physisorption or chemisorption, or a combination of them. The $CO_2$ molecules are attracted to the surface of the sorbent material and bond with it, effectively removing them from the gas stream. The adsorption process can be carried out at ambient or elevated temperatures depending on the type of sorbent used.

Once the one or more adsorption beds 156 become saturated with $CO_2$, the one or more adsorption beds 156 will be regenerated to remove the captured $CO_2$ and restore its adsorption capacity. The regeneration process involves exposing the sorbent material in the one or more adsorption beds to a higher temperature at a low pressure (low pressure is not always are requirement, but in some cases it is optimal), which causes the $CO_2$ to desorb from the sorbent material, allowing it to be collected and stored for disposal or utilization. For example, a carbon dioxide rich stream 158 may be generated from the carbon capture system 108. The carbon dioxide rich stream 158 may be sequestered or exported for any other industrial use. The regenerated sorbent material is then cooled down during the cooling process and reused in the adsorption process.

The plurality of adsorption beds 156 may be partitioned within the carbon capture system 108, such that a first group of adsorption beds are operating in the adsorption process (thereby collecting $CO_2$) while a second group is in the regeneration and/or cooling process. The first group and the second group may then be switched (such that the first group is operating in the regeneration and/or cooling process and the second group is operating in the regeneration process) and the process repeated to ensure the carbon capture system 108 is continually capturing $CO_2$.

A steam bleed line 178 may extend from the steam supply line 148 to the carbon capture system 108 to provide a flow of steam for use in the regeneration process. A return line 180 may extend from the carbon capture system 108 to the condensate return line 151 to return spent fluid (e.g., steam utilized in the regeneration process). A bleed control valve 182 may be disposed on, and in fluid communication with, the steam bleed line 178. The bleed control valve 182 may regulate the amount of steam permitted to flow through the steam bleed line 178. In other words, the amount of steam flowing through the steam bleed line 178 may be adjusted (or modified) by modulating (or actuating) the bleed control valve 182.

While exemplary embodiments of the carbon capture system 108 include a plurality of adsorption beds 156, the carbon capture system 108 may apply various techniques including but not limited to pressure swing adsorptions, temperature swing adsorption, rapid thermal swing adsorption, vacuum temperature swing adsorption, chemical absorption, cryogenic separation, liquid solvent-based adsorption, and membrane separation to separate the remaining carbon dioxide from the exhaust gas.

In various embodiments, the carbon capture system 108 may employ pressure swing adsorption (PSA). PSA may be used for separation of carbon dioxide from a mixture of gases. In PSA techniques, at a high partial pressure, solid molecular sieves can adsorb carbon dioxide. As a result, at lower partial pressures (mostly vacuum conditions), carbon dioxide is removed from the mixture of gases when this mixture is passed through an adsorption bed. Regeneration of the bed is accomplished by depressurization and purging. Typically for critical operations, a plurality of adsorption vessels are used for continuous separation of carbon dioxide, in which one adsorption bed is used while the others are regenerated.

In exemplary embodiments, the carbon capture system 108 may employ temperature swing adsorption (TSA). In TSA, the sorbent adsorbs the $CO_2$ from the cathode output products at cold temperatures (preferably between cryogenic low temperature up to <60° C.). Subsequently, the saturated sorbent bed undergoes desorption by increasing the temperature (typically >100° C.). The desorption may happen under vacuum condition or with the presence of sweep gas to lower the partial pressure of $CO_2$. The heat required for desorption may be supplied by steam from the low pressure steam turbine. Alternatively, or additionally, the heat required for desorption may be supplied directly via joule electric heating or microwave heating. Finally, the sorbent bed will be cooled back to the initial temperature so that the bed is ready for the next adsorption cycle.

In certain embodiments, the carbon capture system 108 may separate carbon dioxide from the exhaust gas by chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of CaCO3, which can again reform $CaCO_3$ to CaO.

In some embodiments, membrane separation technology may also be used by the carbon capture system 108 for separation of carbon dioxide from the exhaust gas. The membranes used for high temperature carbon dioxide separation include zeolite and ceramic membranes, which are selective to $CO_2$. Membrane separators work more efficiently at higher pressures, and use of a membrane separator to separate the carbon dioxide from the exhaust gas may be achieved by further compression (e.g., with one or more compressors upstream of the carbon capture system 108).

In other embodiments, another technique that may be used by the carbon capture system 108 for separation of $CO_2$ from the exhaust gas may include, but is not limited to, chemical absorption of $CO_2$ using amines. The exhaust gas may be cooled to a suitable temperature to use chemical absorption of carbon dioxide using amines. This technique is based on alkanol amines solvents that have the ability to absorb carbon dioxide at relatively low temperatures, and are easily regenerated by raising the temperature of the rich solvents. A carbon dioxide rich stream is obtained after regeneration of the rich solvent. The solvents used in this technique may include pure or a mixture of triethanolamine, monoethanolamine, diethanolamine, diisopropanolamine, diglycolamine, and piperazine.

In some other embodiments, the carbon capture system may comprise at least one absorption vessel, where a chemical absorption technique is used. In yet another embodiment the carbon dioxide separator comprises at least one membrane separator.

In exemplary embodiments, the carbon capture system may include at least one adsorption bed 156, in which a TSA technique may be used to separate the carbon dioxide from the exit stream exhaust gas. Particularly, in exemplary embodiments, the carbon capture system 108 may include a plurality of adsorption beds 156 (e.g., between about 10 and about 500 adsorption beds, or such as between about 10 and about 400 adsorption beds, or such as between about 30 and about 250 adsorption beds, or such as between about 10 and about 100 adsorption beds). In operation, some adsorption beds 156 will undergo adsorption and some adsorption beds 156 may undergo desorption, while the remaining adsorption beds undergo cooling for a temperature swing adsorption process. Under part load, only some of the adsorption beds will be required to be operational owing to reduced $CO_2$ flow rate in the exhaust gas (or cathode output products), which makes other adsorption beds 156 stand-by. Ambient air can be supplied to these stand-by adsorption beds 156 to adsorb additional $CO_2$ from the atmosphere, thereby achieving negative system emissions. Alternatively, or additionally, some additional adsorption beds can be added which can act as a direct air capture system accepting steam from the steam turbine for desorption. In this way, negative carbon emission may be achieved during normal full load condition.

In other embodiments, the adsorption beds 156 may be direct contact adsorption beds. Direct contact adsorption beds include one large rotating bed that includes many segments which undergo different processes. In such embodiments, the carbon capture system 108 may include between about 1 and about 100 direct contact adsorption beds.

Referring specifically to FIG. 2, briefly, the carbon capture system 108 may be a first carbon capture system 109, and the CCPP 100 may further include a second carbon capture system 111 disposed in fluid communication on the bypass line. The second carbon capture system 111 may utilize any of the adsorption techniques described above. For example, the second carbon capture system 111 may be configured similarly to the first carbon capture system 109, such that the second carbon capture system 111 includes a plurality of adsorption beds 156. The second carbon capture system 111 may be configured to remove a portion (such as a third portion) of pollutants (e.g., $CO_2$) from the second amount of exhaust gas flowing through the bypass line 168.

Referring back to both FIGS. 1 and 2, the combined cycle system 100 may further include an air inlet line 160 fluidly coupled to the atmosphere (or the ambient environment) and to the carbon capture system 108. Particularly, the air inlet line 160 may be in fluid communication with each of the adsorption beds 156, such that additional air may be supplied to stand-by adsorption beds 156 for additional carbon capture. In many embodiments, a pump 162 (such as a fan or blower) and a valve 164 may be disposed in fluid communication on the air inlet line 160. The valve 164 may be actuatable between an open position (which allows for air to flow through therethrough) and a closed position (which restricts or otherwise prevents the passage of air). The valve 164 may be downstream of the pump 162. The pump 162 may create a pressure differential that pulls air from the atmosphere when the pump is operating. The air from the atmosphere may be passed through the carbon capture system 108 (e.g., the adsorption bed 156) to remove any pollutants (e.g., $CO_2$) present in the air. This advantageously allows the combined cycle system 100 to have negative carbon dioxide emissions because all of the carbon dioxide (e.g., 100%) in the exhaust gas from the turbine section 16 may be captured by the fuel cell 106 and the carbon capture system 108, and additional atmospheric air may be introduced to the carbon capture system 108 by the air inlet line 160 for carbon dioxide removal of the additional atmospheric air.

Using the various techniques described herein, a carbon dioxide rich stream 158 is generated from the carbon capture system(s) 108. The carbon dioxide rich stream 158 may be sequestered or exported for any other industrial use.

In many embodiments, the combined cycle system 100 may further include an exhaust line 166 extending between the carbon capture system 108 and the exhaust stack 110. Particularly, the exhaust line 166 may extend between an outlet of the adsorption bed 156 and the exhaust stack 110. The exhaust stack 110 may exhaust the exhaust gases (which have had the pollutants removed) to the atmosphere.

As described above, the fuel cell 106 and the carbon capture system 108 may collectively remove all of the pollutants (e.g., carbon dioxide) from the exhaust gas exiting the topping cycle 102 prior to exhaustion of the exhaust gas into the atmosphere via the exhaust stack 110. For example, between about 85% and about 100% of the pollutants from the exhaust gases exiting the topping cycle 102 are captured collectively by the fuel cell 106 and the carbon capture system 108 (e.g., the adsorption bed 156). The fuel cell 106 may remove a majority of the carbon dioxide from the exhaust gas, and the carbon capture system 108 may remove the remainder of the carbon dioxide from the exhaust gas. Particularly, between about 50% and about 90% of the carbon dioxide from the exhaust gas may be removed in the fuel cell 106 when exhaust gas recirculation is implemented, or such as between about 75% and about 85% without exhaust gas recirculation. While more carbon dioxide may be removed in the fuel cell 106, this is not possible without overly stressing the fuel cell 106, reducing the life of the fuel cell 106, and reducing the electric efficiency (i.e., the ratio between the electricity produced from the fuel cell to the fuel energy supplied at the anode) of the fuel cell 106. As such, operating the fuel cell 106 in a manner that removes between about 75% and about 85% of the carbon dioxide from the exhaust gas advantageously preserves the life of the fuel cell 106 and allows for efficient operation. The remainder of the carbon dioxide in the exhaust gas exiting the turbine section 16, e.g., between about 10% and about 30% of the carbon dioxide in the exhaust gas (or such as between about 15% and about 25% of the carbon dioxide in the exhaust gas) may be removed by the carbon capture system 108 (e.g., the adsorption beds 156 in exemplary embodiments).

In many embodiments, as shown in FIGS. 1 and 2, the combined cycle system 100 may include an exhaust gas recirculation line 170 that fluidly couples the turbine section 16 to the compressor section 20, such that exhaust gas from an outlet of the turbine section 16 are provided to an inlet of the compressor section 20. The exhaust gas recirculation line 170 may extend from the exhaust gas outlet line 117 to the compressor section 20. In such embodiments, the compressor 20 may receive ambient air 171 as well as recirculated exhaust gas. When exhaust gas recirculation is introduced, this increases the $CO_2$ mol % in the gas turbine exhaust gases from about 4.3% to about ~8%, which allows for the fuel cell 106 to operate at higher efficiency. For example, with exhaust gas recirculation, the fuel cell 106 may remove up to 90% of the $CO_2$ from the exhaust gases. The exhaust gas recirculation line 170 selectively divert a portion of the exhaust gas from the exhaust gas outlet line 117 back to the inlet of the compressor section 20. For example, a valve 172 may be disposed on the exhaust gas recirculation line 170. The valve 172 may be selectively actuated between an open position (which allows for exhaust gas recirculation) and a closed position (which restricts or prevents exhaust gas recirculation). Additionally, in exemplary embodiments, an exhaust gas cooler 174 may be disposed on the exhaust gas recirculation line 170. The exhaust gas cooler 174 may be a heat exchanger that cools the exhaust gas within the exhaust gas recirculation line 170 in order to meet inlet temperature requirements for the gas turbine 10.

In various embodiments, the various components in the CCPP 100 may be sized based on carbon capturing requirements. For example, the fuel cell 106 and the carbon capture system 108 may be sized depending on the full range of potential outputs from the topping cycle 102, e.g., the gas turbine 10. Particularly, the fuel cell 106 and the carbon capture system 106 may be sized to collectively capture all of the $CO_2$ emitted from the gas turbine 10 in any operational condition (e.g., when the gas turbine is operating at full speed no load, low loads, base load, full load, or other operational conditions of the gas turbine engine 10). For example, the carbon capture system 108 may be variably sized by increasing or decreasing the number of adsorption beds 156.

Figure 3:
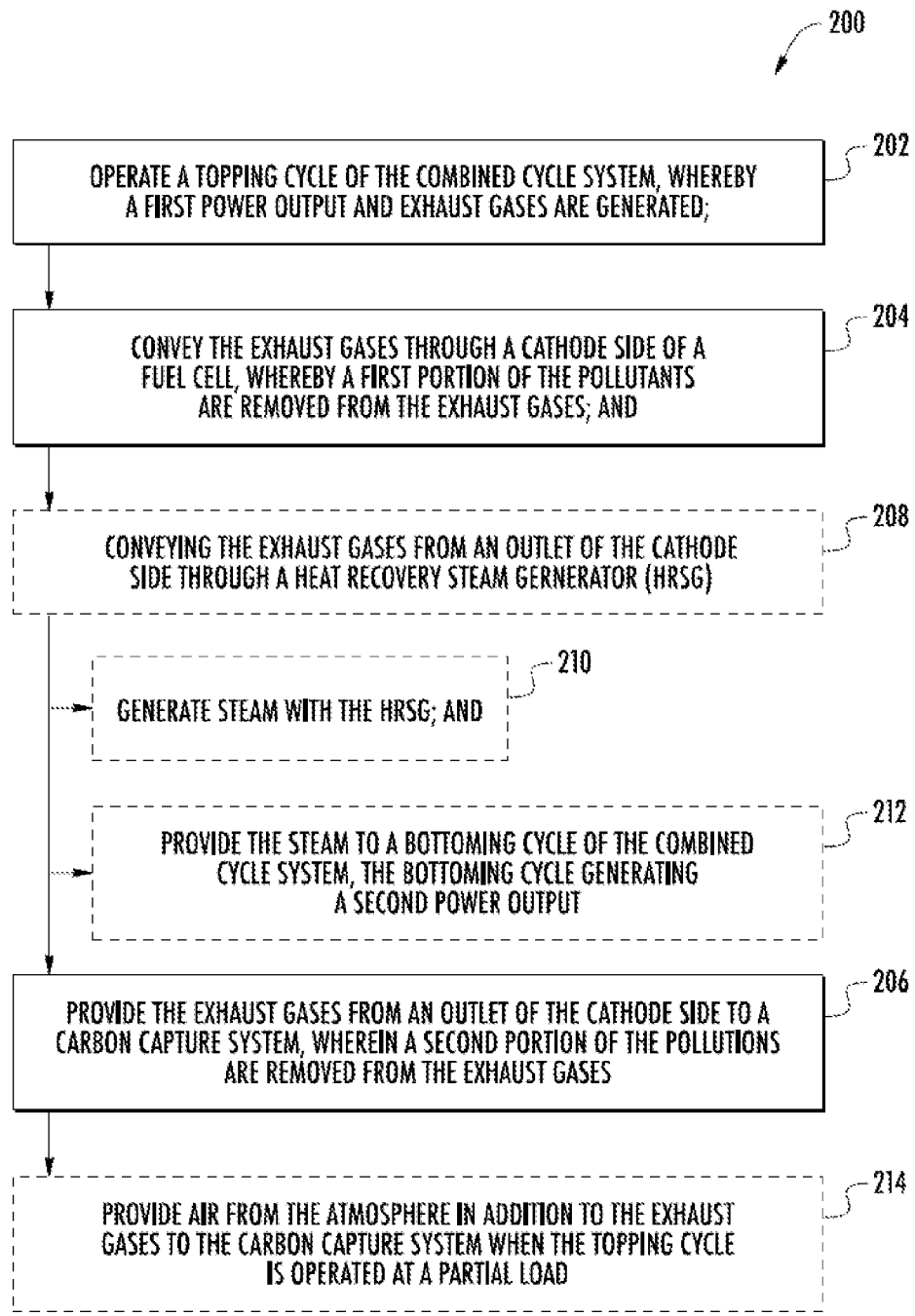
FIG. 3 is a flow diagram of a method of removing pollutants in a combustion system in accordance with embodiments of the present disclosure; and, FIG. 4 is a flow diagram of a method of operating a combustion system in accordance with embodiments of the present disclosure.

Referring now to FIG. 3, a flow diagram of one embodiment of a method 200 for removing pollutants in a combined cycle system is illustrated in accordance with aspects of the present subject matter. In general, the method 200 will be described herein with reference to the combined cycle system 100 described above with reference to FIGS. 1 and 2. However, it will be appreciated by those of ordinary skill in the art that the disclosed method 200 may generally be utilized with any suitable combined cycle system and/or may be utilized in connection with a system having any other suitable system configuration. In addition, although FIG. 3 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown, the method 200 may include at (202) operating a topping cycle 102 of the combined cycle system 100, whereby a first power output and exhaust gases are generated. For example, operating a topping cycle 102 may include operating a gas turbine 10 at part or full load. As a result, a first power output and exhaust gases are generated. The first power output may be generated by the first load 14. The first load 14 may, for instance, be an electrical generator coupled to the gas turbine 10 via one or more shafts, which rotate to produce the first power output. The gas turbine 10 may burn natural gas fuel in the combustion section 18, which may be routed through the turbine section 16 and exhausted as exhaust gases, which may contain pollutants such as carbon dioxide.

In exemplary implementations, as shown, the method 200 may further include at (204) conveying the exhaust gases through a cathode side 116 of a fuel cell 106, whereby a first portion of the pollutants are removed from the exhaust gases. For example, an electrochemical reaction may take place within the fuel cell 106 that both removes the carbon dioxide from the exhaust gas and produces electricity, which may be provided to one or more electrical devices 122 via an electric bus 124. In exemplary embodiments, the fuel cell 106 may be a molten carbonate fuel cell (MCFC), such as an internal reforming MCFC and/or an external reforming MCFC. The MCFC may operate by passing a reactant fuel gas mixed with steam (e.g., natural gas mixed with steam) through the anode side 112, while oxidizing gas (e.g., the exhaust gas which contains carbon dioxide and oxygen) is passed through the cathode side 116, which causes an electrochemical reaction across the electrolyte 114 that removes (or chemically converts) carbon dioxide and produces electricity and hydrogen.

In many implementations, as shown, the method 200 may further include at (206) providing the exhaust gases from an outlet of the cathode side (i.e., the cathode output products) to a carbon capture system 108. A second portion of the pollutants (e.g., carbon dioxide) is removed from the exhaust gases once passed through the carbon capture system 108. For example, the carbon capture system 108 may be an adsorption bed 156 that removes the remainder of the carbon dioxide from the exhaust gas downstream of the fuel cell 106.

For example, the pollutants may be carbon dioxide, and the first portion of the pollutants removed from the exhaust gases by the cathode side may be a majority (e.g., greater than 50%) of the carbon dioxide in the exhaust gases when exiting the gas turbine 10. As such, the second portion of the pollutants removed from the exhaust gases by the carbon capture system 108 may be a remainder of the carbon dioxide in the exhaust gases. Particularly, up to about 85% of the carbon dioxide in the exhaust gases from the turbine section 16 may be removed (i.e., electrochemically converted) in the cathode side 116 of the fuel cell 106, and the remainder (e.g., about 15%) of the carbon dioxide may be removed by the carbon capture system 108 prior to exhaustion from the exhaust stack 110. For example, between about 85% and about 100% of the pollutants from the exhaust gases exiting the topping cycle 102 are captured collectively by the fuel cell 106 and the carbon capture system 108 (e.g., the adsorption bed 156). The fuel cell 106 may remove a majority of the carbon dioxide from the exhaust gas, and the carbon capture system 108 may remove the remainder of the carbon dioxide from the exhaust gas. Particularly, between about 70% and about 90% of the carbon dioxide from the exhaust gas may be removed in the fuel cell 106, or such as between about 75% and about 85%. While more carbon dioxide may be removed in the fuel cell 106, this is not possible without overly stressing the fuel cell 106, reducing the life of the fuel cell 106, and reducing the efficiency of the fuel cell 106. As such, operating the fuel cell 106 in a manner that removes between about 50% and about 85% (or such as between about 50% and about 90% when exhaust gas recirculation is implemented) of the carbon dioxide from the exhaust gas advantageously preserves the life of the fuel cell 106 and allows for efficient operation. The remainder of the carbon dioxide in the exhaust gas exiting the turbine section 16, e.g., between about 15% and about 50% of the exhaust gas (or such as between about 15% and about 25%) may be removed by the carbon capture system 108 (e.g., the adsorption bed 156 in exemplary embodiments).

In many implementations, operating the combined cycle system 100 may generate a total power output (e.g., the summation of the power generated by the first load 14, the power generated by the second load 24, and the power output 120 of the fuel cell 106). In exemplary implementations, operating the fuel cell 106 and the carbon capture system 108 may require a power supply that is between about 0.5% and about 5% of the total power output (or such as between about 3% and about 5%). As discussed above, the fuel cell 106 may be capable of more aggressive operation, in which greater than 85-90% of the carbon dioxide is captured in the fuel cell 106; however, this increases the contribution from the loss mechanisms significantly, such as cathode polarization (which is the prevailing resistance due to low concentration of carbon dioxide), ohmic resistance, anode polarization, and activation loses. This reduces the overall plant efficiency, or electrical efficiency of the fuel cell 106. Operating the fuel cell 106 at a carbon dioxide consumption of up to about 85% while capturing the remaining carbon dioxide with an additional carbon capture system 108 (e.g., an adsorption bed 156 in exemplary embodiments) advantageously only requires a power supply that is between about 3% and about 5% of the total power output of the combined cycle system 100, which is lower than other designs) for achieving 100% carbon capture rate because the specific energy required to capture the $CO_2$ (MJ/kg of $CO_2$ captured) monotonically increases as the carbon capture rate increases. Additionally, fuel cell 106 (such as an MCFC) integration produces about 20-25% additional power therefore, the plant net power output is increased whereas all other carbon capture technologies consume energy, thereby lowering the net power output from the plant. The fuel cell 106 (e.g., an MCFC) may produces excess power of about 20% to 25% (assuming a carbon capture rate of about 85%; when the carbon capture rate is reduced to about 50%, the lower range of the excess power may be about 10%); however, it also consumes fuel to do so. Increasing the $CO_2$ capture rate from fuel cell 106 increases the losses within fuel cell 106 therefore reducing the fuel to electric efficiency of the fuel cell 106, thereby making the power production from fuel cell 106 relatively lesser efficient compared to producing power from combined cycle power plant. Moreover, the separation system 134 consumes parasitic load, and these contributes to the reduction of the overall plant efficiency by greater than about 2% (which may increase as the carbon capture rate in the fuel cell 106 is increased). In implementations where the carbon capture rate in the fuel cell 106 is reduced to about 50%, the reduction in overall plant efficiency may be about 1%.

The maximum $CO_2$ capture limit of the fuel cell 106 (such as an MCFC) will vary as the function of the $CO_2$ concentration in the exhaust gas. The gas turbine exhaust gas 34 which contains typically about 5% mole of $CO_2$. When exhaust gas recirculation is implemented, the % mol increases to about 8% mole of $CO_2$, which in turn increases the maximum $CO_2$ capture by the fuel cell 106 from about 85% to about 90%. Other processes, such as industrial processes, may have high $CO_2$ concentration exhaust gases (for example, cement plant exhaust will have about 30% mole of $CO_2$). In such implementations, when the fuel cell is supplied with exhaust gas from an industrial process having high % mol of $CO_2$ (such as a cement plant or a coal plant) the fuel cell may achieve higher capture rates (such as greater than 90% carbon capture rate).

In optional implementations, as indicated by the dashed box, the method 200 may include at (208) conveying the exhaust gases from an outlet of the cathode side 116 through a heat recovery steam generator 32 (HRSG) prior to providing the exhaust gases to the carbon capture system 108. In such embodiments, the method may include at (210) generating steam with the HRSG 32 and at (212) providing the steam to a bottoming cycle 104. The bottoming cycle 104 may generate a second power output. For example, the bottoming cycle 104 may be a steam turbine system 22 that drives a second load 24 for producing electrical power. The second load 24 may also be an electrical generator for generating electrical power.

In some embodiments, the method 200 may include at (214) providing air from the atmosphere in addition to the exhaust gases to the carbon capture system 108 (e.g., when the topping cycle 102 is operated at a partial load for a normal sized adsorption bed, or when the topping cycle 102 is operated at full load for an oversized adsorption bed). For example, the air from the atmosphere may be introduced to the carbon capture system 108 via the air inlet line 160 when the gas turbine 10 is operating at partial load for systems having a carbon capture system 108 that is sized based on the carbon dioxide output of the topping cycle 102. Alternatively, the air from the atmosphere may be introduced to the carbon capture system 108 via the air inlet line 160 when the gas turbine 10 is operating at full load for systems having a carbon capture system 108 that is oversized (e.g., sized larger than the gas turbine carbon dioxide output requirement). As a result of providing air in addition to exhaust gas from the gas turbine, carbon dioxide is removed from the air and the exhaust gas such that the combustion system generates negative carbon capture emissions. The gas turbine 10 may be operational at full load (e.g., maximum capacity or 100%) and partial load (e.g., less than maximum capacity or less than 100%). During full load, the gas turbine 10 may generate a large amount of exhaust gases, which may utilize the full carbon dioxide capturing capacity of the fuel cell 106 and the carbon capture system 108. However, in partial load conditions, the gas turbine 10 may generate less exhaust gases, thereby giving the carbon capture system 108 additional capacity for capturing carbon dioxide. This additional capacity may be utilized for capturing carbon dioxide form the atmosphere, which advantageously allows for the fuel cell 106 and the carbon capture system 108 to capture greater than 100% of the carbon dioxide produced in the topping cycle 102 (e.g., gas turbine 10). For example, all of the carbon dioxide produced in the topping cycle 102 may be captured collectively by the fuel cell 106 and the carbon capture system 108, and additional carbon dioxide may be captured from the atmosphere by introducing air from the atmosphere to the carbon capture system 108 in addition to the exhaust gases.

Figure 4:
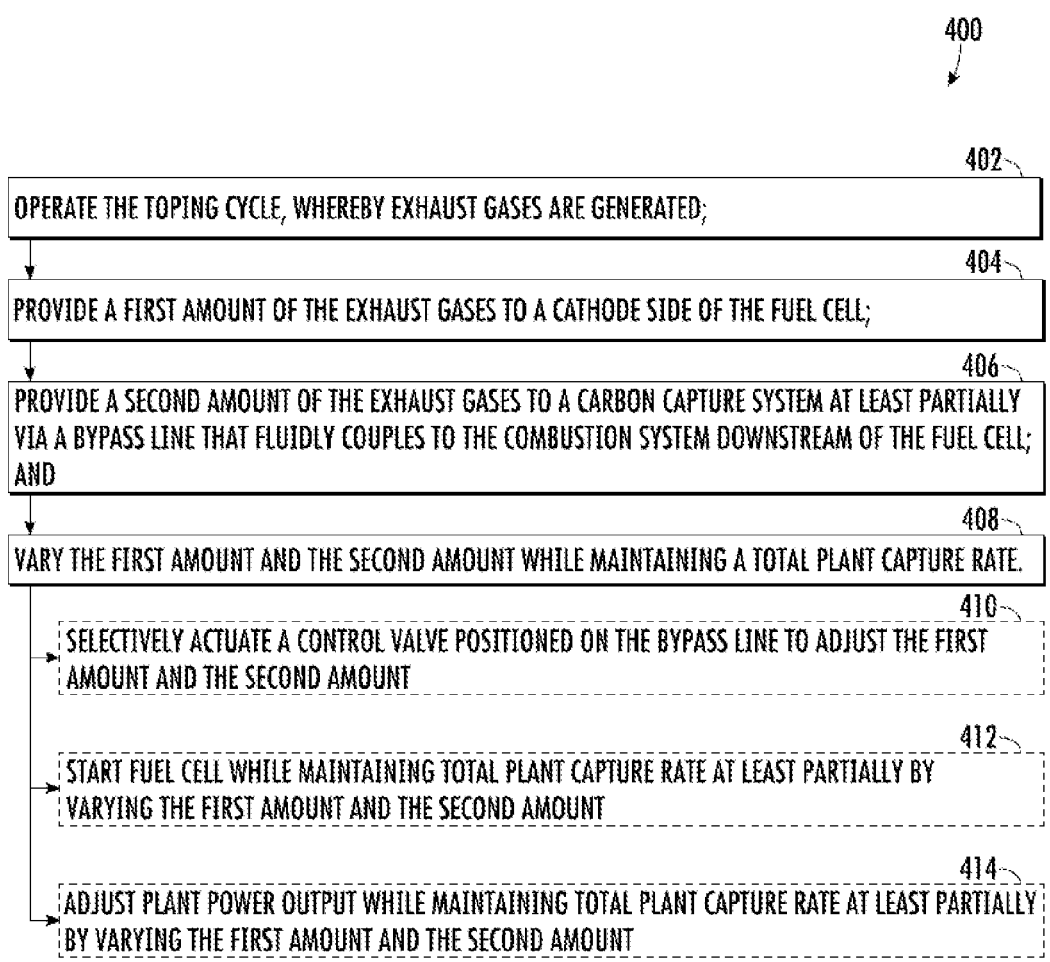

Referring now to FIG. 4, a flow diagram of one embodiment of a method 400 for operating a combined cycle system is illustrated in accordance with aspects of the present subject matter. In general, the method 400 will be described herein with reference to the combined cycle system 100 described above with reference to FIGS. 1 and 2. However, it will be appreciated by those of ordinary skill in the art that the disclosed method 400 may generally be utilized with any suitable combined cycle system and/or may be utilized in connection with a system having any other suitable system configuration. In addition, although FIG. 4 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown, the method 400 may include at (402) operating the toping cycle. As a result of operating the topping cycle, exhaust gases are generated. For example operating the topping cycle at (402) may also produce a first power output. In exemplary implementations, the topping cycle may be a gas turbine that includes a compressor section, a combustion section, and a turbine section. In such embodiments, operating the topping cycle at (402) may include providing fuel to a combustion section to produce combustion gases and providing the combustion gases to a turbine section to generate the first power output and the exhaust gases.

In many embodiments, the method 400 may include at (404) providing a first amount of the exhaust gases to a cathode side of the fuel cell. For example, the first amount of exhaust gases may be conveyed to the cathode side of the fuel cell via a cathode inlet line. Subsequently, the first amount of exhaust gases may be conveyed through the cathode side of the fuel cell. In many implementations, the fuel cell may be operated to remove pollutants (e.g., $CO_2$) from the first amount of exhaust gases and to produce a fuel cell power output. Particularly, operating the fuel cell may include providing fuel (which may be mixed with steam) to an anode side of the fuel cell and providing the first amount of exhaust gases to the cathode side of the fuel cell.

In various embodiments, the method 400 may include at (406) providing a second amount of the exhaust gases to the carbon capture system at least partially via a bypass line that fluidly couples to the combustion system downstream of the fuel cell. For example, the bypass line may extend from the cathode inlet line to the cathode outlet line. Particularly, the method may include providing the cathode output products to the carbon capture system along with the second amount of the exhaust gases as a mixture.

In exemplary embodiments, the method may include at (408) varying the first amount of exhaust gas and the second amount of exhaust gas while maintaining a total plant capture rate. The total plant capture rate may be the amount of pollutants captured by the system, which may be the summation of the pollutants captured by the fuel cell and the carbon capture systems (e.g., the fuel cell capture rate and the carbon capture system capture rate). The total plant capture rate may be about 100% of the $CO_2$ contained in the exhaust gas.

For example, in order to maintain the total capture rate when the first amount of exhaust gas provided to the fuel cell is reduced (thereby reducing the fuel cell capture), the second amount of exhaust gas provided to the carbon capture system via the bypass line may be increased (proportionally to the reduction of the first amount in some embodiments), and the carbon capture system capture rate may be increased to maintain the total capture rate. By contrast, in order to maintain the total capture rate when the first amount of exhaust gas provided to the fuel cell is increased (thereby increasing the fuel cell capture), the second amount of exhaust gas provided to the carbon capture system via the bypass line may be reduced (proportionally to the increase of the first amount in some embodiments), and the carbon capture system capture rate may be reduced to maintain the total capture rate.

In optional implementations, as indicated by the dashed box, varying at (408) may include at (410) selectively actuating a control valve positioned on the bypass line to adjust the first amount and the second amount. That is the first amount of exhaust gas flowing through the cathode side and the second amount of exhaust gas flowing through the bypass line may be adjusted (or modified) by modulating (or actuating) the bypass control valve. The bypass control valve may be operable to selectively restrict the flow of exhaust gas through the bypass line. For example, the bypass line may be selectively actuatable between a fully open position, in which the flow of exhaust gas therethrough is unrestricted, and a fully closed position, in which the flow of exhaust therethrough is fully restricted. In addition, the bypass control valve may be actuatable to any position between the fully open and fully closed position to restrict a portion of the exhaust gases therethrough, such as anywhere between 0% and 100% restricted.

In some implementations, the method may include conveying the cathode output products and the second amount of exhaust gases as a mixture through a heat recovery steam generator prior to providing the mixture to the carbon capture system. In such embodiments, the method may include generating steam with the HRSG and providing the steam to a bottoming cycle. The bottoming cycle may generate a second power output. For example, the bottoming cycle may be a steam turbine system that drives a second load for producing electrical power. The second load may also be an electrical generator for generating electrical power, such as the second power output.

In various implementations, the method 400 may include at (410) starting the fuel cell while maintaining the total plant capture rate at least partially by varying the first amount and the second amount. For example, the method may include initiating operation of the fuel cell, whereby the fuel cell transitions between a minimum pollutant capturing state and a maximum pollutant capturing state over a time period. Initiating operation may include initiating carbon capture by utilizing the fuel cell. In many implementations, the fuel cell may not be capable of carbon capture immediately after starting, and in this way, "initiating operation" refers to when the fuel cell is initially capable of carbon capture. For example, the fuel cell may be started and operated in a controlled environment for an initial time period (e.g., provided a controlled level of fuel to the anode side and oxidant to the cathode side). Once the fuel cell stabilized (finished operating in the controlled environment), it may initiate operation (or carbon capture) by being provided with exhaust gases from the topping cycle, during which period the fuel cell transitions between the minimum pollutant capturing state and the maximum pollutant capturing state.

For example, the fuel cell may warm up continuously over a period of between about 2 days and about 7 days. While the fuel cell is transitioning between the minimum pollutant capturing state and the maximum pollutant capturing state, the fuel cell may be capable of continuously increased carbon capture rates. As such, the method may include providing the first amount of the exhaust gases to the cathode side of the fuel cell at a generally increasing rate over the time period while the fuel cell transitions between the minimum pollutant capturing state and the maximum pollutant capturing state. The first amount of the exhaust gases may be provided at a generally increasing rate to the fuel cell that is proportional to a warming-up rate at which the fuel cell is starting up. In such implementations, the method may include providing the second amount of the exhaust gases as a remainder of the exhaust gases to a carbon capture system. That is, all the excess exhaust gases not provided to the fuel cell may be provided to the carbon capture system. In exemplary embodiments, the method may include simultaneously providing the second amount of the exhaust gases to the carbon capture system at a generally decreasing rate over the time period while the fuel cell transitions between the minimum pollutant capturing state and the maximum pollutant capturing state. The generally decreasing rate may be proportional to the generally increasing rate.

As used herein, "generally increasing rate" may include a rate that follows an increasing trend. That is, the generally increasing rate doesn't have to be constantly increasing, it may be iteratively increasing (such that the exhaust gases provided may pause or break while still following the increasing trend). In other embodiments, the generally increasing rate may be continuously (or constantly) increasing. Similarly, as used herein, "generally decreasing rate" may include a rate that follows an decreasing trend. That is, the generally decreasing rate doesn't have to be constantly decreasing, it may be iteratively decreasing (such that the exhaust gases provided may pause or break while still following the decreasing trend). In other embodiments, the generally decreasing rate may be continuously (or constantly) decreasing.

In various implementations, the method 400 may include at (414) adjusting the plant power output while maintaining the total plant capture rate at least partially by varying the first amount and the second amount. For example, operating the topping cycle may produce a first power output, operating the bottoming cycle may produce a second power output, and operating the fuel cell may produce a fuel cell power output. The total plant power output may includes the first power output, the second power output, and the fuel cell power output (e.g., the total plant power output may be the summation of the first power output, the second power output, and the fuel cell power output).

In various implementations, adjusting the plant power output while maintaining the total plant capture rate may be done by adjusting the first amount of exhaust gases provided to the cathode side and adjusting an amount of fuel supplied to the anode side of the fuel cell. As a result, the fuel cell power output may be adjusted, and the fuel cell capture rate is adjusted. Subsequently, or simultaneously, the capture rate of the carbon capture system may be adjusted by adjusting a flow of steam provided to the carbon capture system, whereby the second power output is adjusted. For example, the steam may be provided to the carbon capture system a steam bleed line, which may adjust the carbon capture system capture rate by increasing the rate at which the adsorption beds may be regenerated. However, adjusting an amount of steam from the steam turbine adjusts the second power output, thereby adjusting the total plant power output. As such, the plant power output may be adjusted while maintaining a total plant capture rate. Particularly, adjusting the plant power output may include either increasing or decreasing the plant power output while maintaining the total plant capture rate.

In many implementations, reducing the plant power output while maintaining the total plant capture rate may be done by reducing the first amount of exhaust gases provided to the cathode side and reducing an amount of fuel supplied to the anode side of the fuel cell. As a result, the fuel cell power output may be reduced, and the fuel cell capture rate is reduced. Subsequently, or simultaneously, the capture rate of the carbon capture system may be increased by increasing a flow of steam provided to the carbon capture system, whereby the second power output is reduced. For example, the steam may be provided to the carbon capture system a steam bleed line, which may increase the carbon capture system capture rate by increasing the rate at which the adsorption beds may be regenerated. However, pulling steam from the steam turbine reduces the second power output, thereby lowering the total plant power output. As such, the plant power output may be reduced while maintaining a total plant capture rate (which may be between about 70% and about 100%, or which may be about 100%).

In other implementations, increasing the plant power output while maintaining the total plant capture rate may be done by increasing the first amount of exhaust gases provided to the cathode side and increasing an amount of fuel supplied to the anode side of the fuel cell. As a result, the fuel cell power output may be increased, and the fuel cell capture rate is increased. Subsequently, or simultaneously, the capture rate of the carbon capture system may be decreased by decreasing a flow of steam provided to the carbon capture system, whereby the second power output may also be increased. As such, the plant power output may be reduced while maintaining a total plant capture rate (which may be between about 70% and about 100%, or which may be about 100%).

In many implementations, varying the first amount and the second amount impacts the capturing capacity of the adsorption beds in the carbon capture system and the speed at which carbon is captured, which can be advantageous in certain scenarios. For example, when the first amount of exhaust gas supplied to the fuel cell is reduced, and the second amount of exhaust gas supplied to the carbon capture system is increased, the capturing capacity (e.g., the capacity of the sorbent material in the adsorption beds) and/or the mass transfer kinetics (i.e., how quickly the $CO_2$ is adsorbed on the sorbent) is increased at least partially because the stream of gases supplied to the carbon capture system has an increased amount of $CO_2$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A combustion system comprising: a topping cycle generating a flow of exhaust gas; a bottoming cycle; a fuel cell including an anode side, a cathode side, and an electrolyte, the cathode side receiving the flow of exhaust gas from the topping cycle via a cathode inlet line, the cathode side removing a first portion of pollutants from the exhaust gas; a heat recovery steam generator (HRSG) that receives the exhaust gases from the cathode side via a cathode outlet line, the HRSG generating a flow of steam for use in the bottoming cycle; a bypass line extending from the cathode inlet line to the cathode outlet line; and a carbon capture system fluidly coupled to the HRSG via an HRSG outlet line, the carbon capture system removing a second portion of pollutants from the exhaust gas.

The combustion system as in any preceding clause, further comprising a bypass control valve disposed in fluid communication on the bypass line.

The combustion system as in any preceding clause, wherein the carbon capture system is a first carbon capture system, and wherein the combustion system further comprises a second carbon capture system disposed in fluid communication on the bypass line.

The combustion system as in any preceding clause, wherein each of the first carbon capture system and the second carbon capture system comprise an adsorption bed.

The combustion system as in any preceding clause, further comprising an air inlet line fluidly coupled to the atmosphere and to the carbon capture system.

The combustion system as in any preceding clause, wherein the topping cycle is a gas turbine coupled to a first load, the gas turbine including a compressor section, a combustion section, and a turbine section, the turbine section generating the exhaust gases.

The combustion system as in any preceding clause, further comprising an exhaust gas recirculation line fluidly coupling the turbine section to the compressor section.

The combustion system as in any preceding clause, wherein fuel cell is a molten carbonate fuel cell (MCFC).

The carbon capture system as in any preceding clause, further comprising an exhaust line fluidly extending between the carbon capture system and an exhaust stack.

The combustion system as in any preceding clause, wherein the anode side receives a flow of fuel and/or steam via an anode inlet line.

The combustion system as in any preceding clause, further comprising an anode outlet line fluidly coupled to a separation system for removing water and liquid carbon dioxide from anode output products.

The combustion system as in any preceding clause, wherein between about 85% and about 100% of the pollutants from the exhaust gases exiting the topping cycle are captured collectively by the fuel cell and the carbon capture system.

A method of operating a combustion system, the combustion system comprising a topping cycle, a fuel cell fluidly coupled to the topping cycle, and a carbon capture system the method comprising: operating the toping cycle, whereby exhaust gases are generated; providing a first amount of the exhaust gases to a cathode side of the fuel cell; providing a second amount of the exhaust gases to the carbon capture system at least partially via a bypass line that fluidly couples to the combustion system downstream of the fuel cell; and varying the first amount and the second amount while maintaining a total plant capture rate.

The method as in any preceding clause, wherein varying the first amount and the second amount while maintaining a total plant capture rate further comprises: selectively actuating a control valve positioned on the bypass line to adjust the first amount and the second amount.

The method as in any preceding clause, further comprising providing the cathode output products to the carbon capture system along with the second amount of the exhaust gases.

The method as in any preceding clause, further comprising: initiating operation of the fuel cell, whereby the fuel cell transitions between a minimum pollutant capturing state and a maximum pollutant capturing state over a time period; providing the first amount of the exhaust gases to the cathode side of the fuel cell at a generally increasing rate over the time period while the fuel cell transitions between the minimum pollutant capturing state and the maximum pollutant capturing state; providing the second amount of the exhaust gases as a remainder of the exhaust gases to a carbon capture system.

The method as in any preceding clause, further comprising: simultaneously providing the second amount of the exhaust gases to the carbon capture system at a generally decreasing rate over the time period while the fuel cell transitions between the minimum pollutant capturing state and the maximum pollutant capturing state.

The method as in any preceding clause, further comprising: operating the topping cycle to produce a first power output, wherein operating the topping cycle comprises providing fuel to a combustion section to produce combustion gases and providing the combustion gases to a turbine section to generate the first power output and the exhaust gases; operating the fuel cell to produce a fuel cell power output, wherein operating the fuel cell comprises providing fuel to an anode side of the fuel cell and providing the first amount of exhaust gases to the cathode side of the fuel cell; and operating a bottoming cycle to produce a second power output, wherein operating the bottoming cycle includes providing cathode output products and the second portion of the exhaust gases to a heat recovery steam generator to produce steam, wherein operating the bottoming cycle further includes providing the steam to a steam turbine to produce the second power output, and wherein a total plant power output includes the first power output, the second power output, and the fuel cell power output.

The method as in any preceding clause, further comprising adjusting the plant power output while maintaining the total plant capture rate by: adjusting the first amount of exhaust gases provided to the cathode side and adjusting an amount of fuel supplied to the anode side of the fuel cell, whereby the fuel cell power output is adjusted, and whereby a fuel cell capture rate is adjusted; adjusting a capture rate of the carbon capture system by adjusting a flow of steam provided to the carbon capture system, whereby the second power output is adjusted.

What is claimed is:

1. A combustion system comprising:
a topping cycle generating a flow of exhaust gas;
a bottoming cycle;
a fuel cell including an anode side, a cathode side, and an electrolyte, the cathode side receiving the flow of exhaust gas from the topping cycle via a cathode inlet line, the cathode side removing a first portion of pollutants from the exhaust gas;
a heat recovery steam generator (HRSG) that receives the exhaust gas from the cathode side via a cathode outlet line, the HRSG generating a flow of steam for use in the bottoming cycle;
a bypass line extending from the cathode inlet line to the cathode outlet line;
a first carbon capture system fluidly coupled to the HRSG via a HRSG outlet line, the first carbon capture system removing a second portion of pollutants from the exhaust gas; and
a second carbon capture system disposed in fluid communication on the bypass line.

2. The combustion system as in claim 1, further comprising a bypass control valve disposed in fluid communication on the bypass line.

3. The combustion system as in claim 1, wherein each of the first carbon capture system and the second carbon capture system comprise an adsorption bed.

4. The combustion system as in claim 1, further comprising an air inlet line fluidly coupled to the atmosphere and to the first carbon capture system.

5. The combustion system as in claim 1, wherein the topping cycle is a gas turbine coupled to a first load, the gas turbine including a compressor section, a combustion section, and a turbine section, the turbine section generating the exhaust gas.

6. The combustion system as in claim 5, further comprising an exhaust gas recirculation line fluidly coupling the turbine section to the compressor section.

7. The combustion system as in claim 1, wherein the fuel cell is a molten carbonate fuel cell (MCFC).

8. The combustion system as in claim 1, further comprising an exhaust line fluidly extending between the first carbon capture system and an exhaust stack.

9. The combustion system as in claim 1, wherein the anode side receives a flow of fuel and/or steam via an anode inlet line.

10. The combustion system as in claim 1, further comprising an anode outlet line fluidly coupled to a separation system for removing water and liquid carbon dioxide from anode output products.

11. The combustion system as in claim 1, wherein between about 85% and about 100% of the pollutants from the exhaust gas exiting the topping cycle are captured collectively by the fuel cell and the first carbon capture system.

12. A method of operating a combustion system, the combustion system comprising a topping cycle, a fuel cell fluidly coupled to the topping cycle, a first carbon capture system, and a second carbon capture system, the method comprising:
operating the toping cycle, whereby exhaust gases are generated;
providing a first amount of the exhaust gases to a cathode side of the fuel cell via a cathode inlet line;
providing a heat recovery steam generator (HRSG) that receives the first amount of the exhaust gases from the cathode side via a cathode outlet line, the HRSG generating a flow of steam for use in a bottoming cycle;
providing a second amount of the exhaust gases to the first carbon capture system at least partially via a bypass line that fluidly couples to the combustion system downstream of the fuel cell, the bypass line extending from the cathode inlet line to the cathode outlet line, wherein the second carbon capture system is disposed in fluid communication on the bypass line upstream of the HRSG; and
varying the first amount and the second amount while maintaining a total plant capture rate.

13. The method as in claim 12, wherein varying the first amount and the second amount while maintaining the total plant capture rate further comprises:
selectively actuating a control valve positioned on the bypass line to adjust the first amount and the second amount.

14. The method as in claim 12, further comprising providing cathode output products to the first carbon capture system along with the second amount of the exhaust gases.

15. The method as in claim 12, further comprising:
initiating operation of the fuel cell, whereby the fuel cell transitions between a minimum pollutant capturing state and a maximum pollutant capturing state over a time period;
providing the first amount of the exhaust gases to the cathode side of the fuel cell at a generally increasing rate over the time period while the fuel cell transitions between the minimum pollutant capturing state and the maximum pollutant capturing state;

providing the second amount of the exhaust gases as a remainder of the exhaust gases to the first carbon capture system.

16. The method as in claim 15, further comprising:
simultaneously providing the second amount of the exhaust gases to the first carbon capture system at a generally decreasing rate over the time period while the fuel cell transitions between the minimum pollutant capturing state and the maximum pollutant capturing state.

17. The method as in claim 12, further comprising:
operating the topping cycle to produce a first power output, wherein operating the topping cycle comprises providing fuel to a combustion section to produce combustion gases and providing the combustion gases to a turbine section to generate the first power output and the exhaust gases;
operating the fuel cell to produce a fuel cell power output, wherein operating the fuel cell comprises providing fuel to an anode side of the fuel cell and providing the first amount of exhaust gases to the cathode side of the fuel cell; and
operating the bottoming cycle to produce a second power output, wherein operating the bottoming cycle includes providing cathode output products and the second amount of the exhaust gases to the heat recovery steam generator to produce the steam, wherein operating the bottoming cycle further includes providing the steam to a steam turbine to produce the second power output, and wherein a total plant power output includes the first power output, the second power output, and the fuel cell power output.

18. The method as in claim 17, further comprising adjusting the total plant power output while maintaining the total plant capture rate by:
adjusting the first amount of exhaust gases provided to the cathode side and adjusting an amount of fuel supplied to the anode side of the fuel cell, whereby the fuel cell power output is adjusted, and whereby a fuel cell capture rate is adjusted;
adjusting a capture rate of the first carbon capture system by adjusting a flow of steam provided to the first carbon capture system, whereby the second power output is adjusted.

* * * * *